(12) United States Patent
Guenter

(10) Patent No.: US 6,298,169 B1
(45) Date of Patent: Oct. 2, 2001

(54) RESIDUAL VECTOR QUANTIZATION FOR TEXTURE PATTERN COMPRESSION AND DECOMPRESSION

(75) Inventor: Brian Kevin Guenter, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/181,228

(22) Filed: Oct. 27, 1998

(51) Int. Cl.[7] .................................................. G06K 9/46
(52) U.S. Cl. ............................................ 382/253; 382/232
(58) Field of Search .................................. 382/232, 233, 382/234, 235, 236, 237, 238, 239, 240, 241, 242, 253

(56) References Cited

U.S. PATENT DOCUMENTS 5,892,847 * 4/1999 Johnson ................................ 382/232
6,071,193 * 6/2000 Suzuoki ................................ 463/31

* cited by examiner

*Primary Examiner*—Phouc Tran
*Assistant Examiner*—Amör Alavi
(74) *Attorney, Agent, or Firm*—Christensen O'Connor Johnson Kindness, PLLC

(57) ABSTRACT

A method and apparatus for compressing and decompressing texture patterns using a predefined two or more stage codebook with stored texture block vectors. The method of compressing includes selecting a texture block in the uncompressed texture pattern and determining a distortion value of the selected texture block as compared to a texture block vector stored in the two or more stage codebook. The distortion determination is repeated for a different texture block stored in the two or more stage codebook, until the determined distortion value is the smallest for all texture block vectors stored in the two or more stage codebook. The indices of the stored texture block in the two or more stage codebook are retrieved and stored. The retrieved indices are stored in an index block within an index map, wherein the index blocks correspond to texture blocks in the texture pattern. The two or more stage codebook is generated from a representative texture pattern. Decompressing a compressed texture pattern is performed by accessing and summing the vector components based on the stored index map and multi-stage codebook.

14 Claims, 6 Drawing Sheets

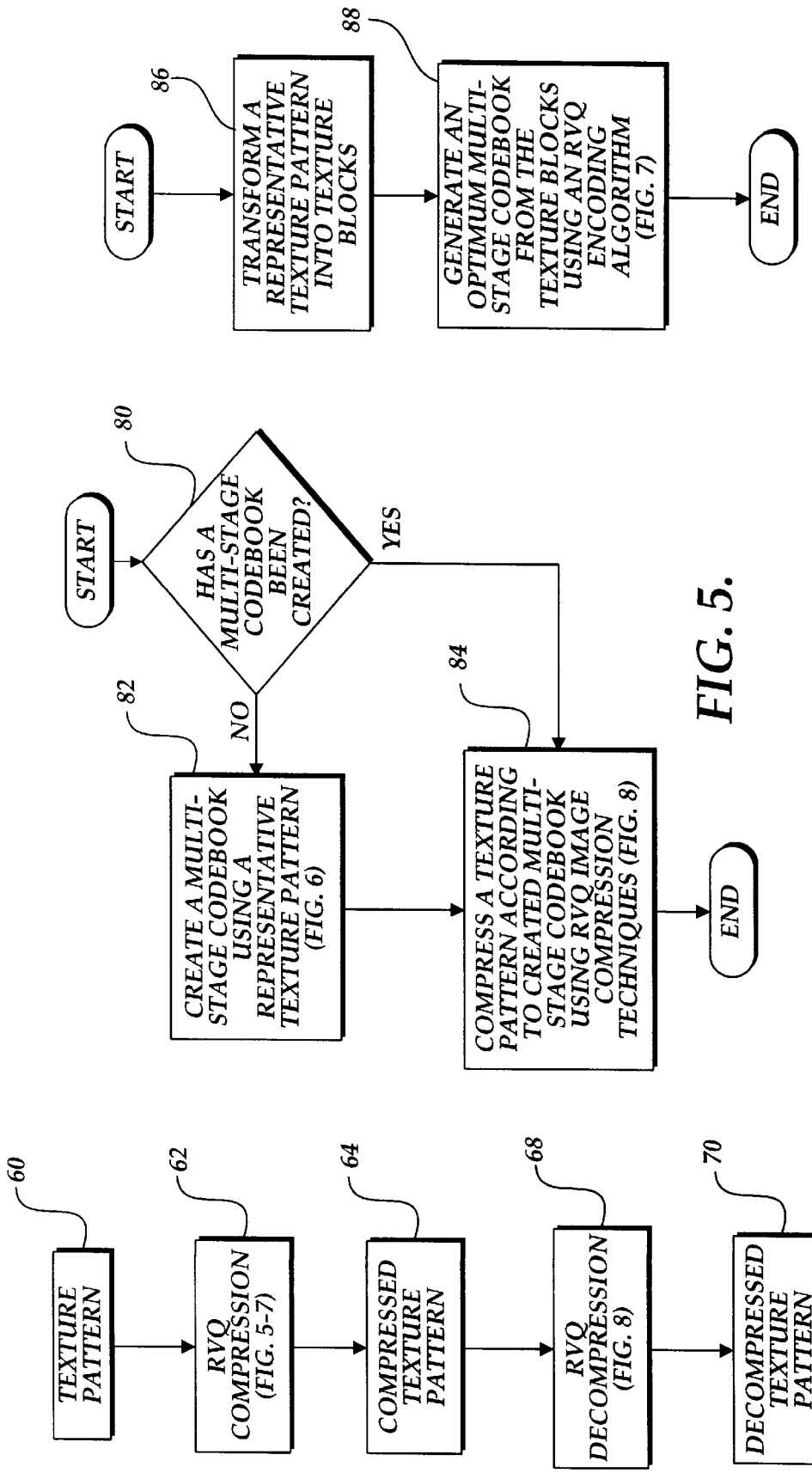

RESIDUAL VECTOR QUANTIZATION FOR TEXTURE PATTERN COMPRESSION AND DECOMPRESSION

FIELD OF THE INVENTION

This invention relates to methods and apparatus for compressing and decompressing texture patterns, and more particularly, methods and apparatus for compressing and decompressing texture patterns by using a codebook technique.

BACKGROUND OF THE INVENTION

While, as will be better understood from the following description, the present invention was developed to improve the quality and compression ratios of compressed texture patterns while allowing somewhat random single pixel decompression, this invention may also find utility in other environments.

Texture pattern mapping is employed on high-end graphics workstations and rendering systems to increase the visual complexity of a scene without increasing its geometric complexity. Texture pattern mapping allows a rendering system to map an image onto simple scene geometry to make objects look much more complex or realistic than the underlying geometry. Recently, texture pattern mapping hardware has become available on lower-end workstations, personal computers, and home game systems.

One of the costs of texture pattern mapping is the memory space occupied by the texture patterns. For a particular scene, the memory space required by the texture patterns is dependent on the number of texture patterns and the size of each texture pattern. In some cases, the memory space occupied by the stored texture patterns may exceed in size the memory space occupied by the stored scene geometry.

In real-time texture mapping hardware systems, texture patterns are generally placed in dedicated memory that can be accessed as quickly as pixels are generated. In some hardware systems, texture patterns are replicated in memory to facilitate fast parallel access. Because texture memory is a limited resource in these systems, it is consumed quickly. Although memory concerns are less severe for software rendering systems, since texture patterns are usually stored in main memory, there are advantages to conserving texture memory. Using less memory for texture patterns may yield caching benefits. One way to alleviate these memory limitations is to store compressed representations of texture patterns in memory. A modified renderer can then render directly from the compressed representation.

Vector quantization (VQ) supports fast decompression while achieving compression ratios of up to 35:1 with acceptable loss in the visual quality of the rendered scene. Processing time is increased only slightly, and incorporating VQ into hardware has very little impact on rendering performance. Unfortunately, VQ compressed texture patterns require large codebooks that take up expensive cache space.

The present invention is directed to overcoming the foregoing and other disadvantages associated with the compression and decompression of texture patterns. More specifically, the present invention is directed to methods and apparatus for providing a high speed, high image quality and high compression ratio texture pattern compression scheme.

SUMMARY OF THE INVENTION

In accordance with this invention, a method and apparatus for compressing and decompressing texture patterns using a predefined two or more stage codebook for storing texture blocks is provided. A texture block is an array of texels, wherein each texel is defined by its offset within the texture block. The method includes selecting a texture block in an uncompressed texture pattern and determining a distortion value for the selected texture block as compared to a texture block stored in the two or more stage codebook. If not below a predetermined threshold, the distortion value determining step is repeated for different texture blocks stored in the two or more stage codebook, until the determined distortion value is below the predetermined threshold. When the determined distortion value is below the predetermined threshold, the indices of the stored texture block in the two or more stage codebook are retrieved and stored.

In accordance with other aspects of this invention, the indices storing step further includes storing the retrieved indices in an index block within an index map, wherein the index blocks correspond to texture blocks in the texture pattern.

In accordance with still other aspects of this invention, the predefined two or more stage codebook is based on a representative texture pattern.

In accordance with yet other aspects of this invention a method for rendering an image with a compressed texture pattern, the compressed texture pattern including a stored index map that includes index blocks, wherein each index block includes codebook block indices to codebook blocks in a predefined two or more stage codebook and a vector component is prestored in each codebook block, is provided. The method of rendering includes determining the coordinates of a texel that is to be mapped to a pixel requested for rendering, determining the texture block and the texels offset within the determined texture block based on the determined texel coordinates, and determining the index block associated with the determined texture block. Then, the codebook block indices are retrieved from the determined index block and vector components from the two or more stage codebook are retrieved based on the retrieved codebook block indices. Next, a texture block vector is generated by adding the retrieved vector components and the texel's value is retrieved from the generated texture block vector based on the determined texel's offset with the texture block. These steps are repeated for all the texels located within the pixel to be rendered. Finally, the pixel is rendered based on the retrieved texel values of the texels located within the pixel.

As will be readily appreciated from the foregoing summary, the invention provides a method and apparatus for compressing and decompressing texture patterns. Because the present invention includes fixed index block (codeword) length and simple decompression properties similar to VQ, better image quality is possible at the same or better compression ratios than previous texture pattern compression techniques.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4 is a flow diagram of RVQ texture pattern compression and decompression;

FIGS. 5–7 are flow diagrams of RVQ texture pattern compression; and

DETAILED DESCRIPTION OF THE PREFERRED EMBODIMENT

Vector Quantization (VQ)

Figure 1:
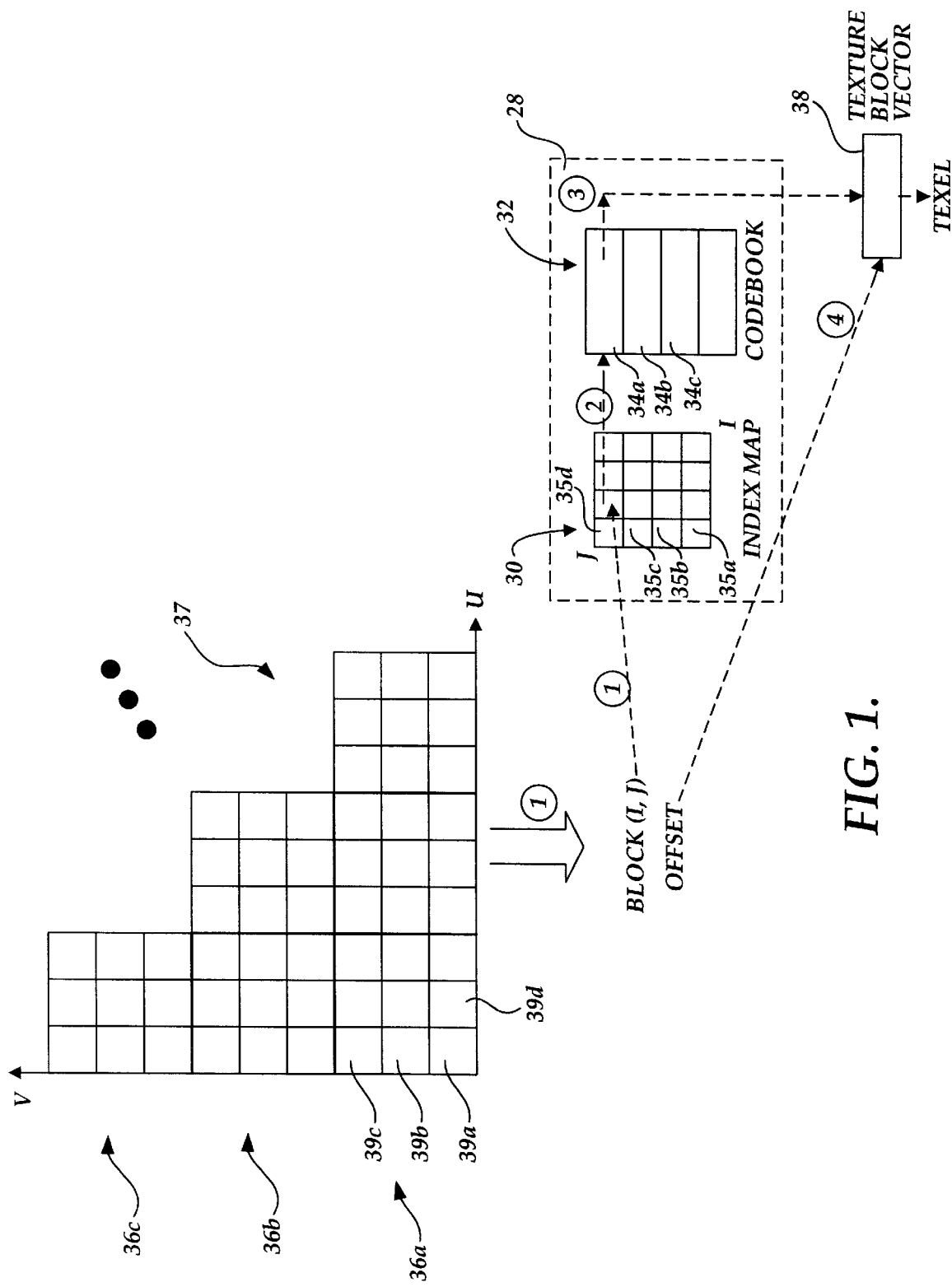
FIG. 1 is a functional illustration of the rendering process of a prior art technique.

As taught in Beers et al., Rendering from Compressed Textures, Computer Graphics 1996, pp. 373–378, and as shown in FIG. 1, a VQ compressed texture pattern 28 is represented by an index map 30 and an encoder (hereinafter codebook) 32 with codebook blocks 34a, 34b, 34c . . . the index map 30 includes i×j index blocks 35a, 35b, 35c . . . that correspond to the texture blocks 36a, 36b, 3c . . . of an uncompressed texture pattern 37 in texture space (u, v). Each texture block 36a, 36b36c . . . includes an array of texels 39a, 39b, 39c . . . . Each codebook block 34a, 34b, 34c . . . stores a texture block vector 38. Each index block 35a, 35b, 35c . . . includes a codebook block index for identifying a codebook block 34a, 34b, 4c . . . of the most closely matching texture block vector 38. The texture block vector 38 identifies the values of all of the texels 39a, 39b, 39c . . . of a texture block 36a, 36b, .6c . . . . Each texel identified in the texture block vector 38 is identified by an offset value that is based on the texel's location within the texture block 36a, 36b, 36c . . . . The texture block vectors 38 represent a reduced set of representative texture blocks. Thus, many index blocks 35a, 35b, 35c . . . may reference the same texture block vector 38, thereby providing a compressed texture pattern.

The steps below describe the VQ rendering process.

1. Determine the texture block corresponding to a texel requested for display and the texel's offset within the determined texture block and determine the index block (i, j) corresponding to the determined texture block;
2. Lookup the codebook block index associated with the determined index block;
3. Determine the texture block vector in the codebook block that corresponds to the codebook block index; and
4. Lookup the texel within the determined vector according to the determined texel's offset.

The four step process is shown by the corresponding circled numbers in FIG. 1.

VQ provides a fixed codebook block index (codeword) length, which is especially important for hardware implementations, since it can significantly reduce the complexity of the decompression hardware.

Residual Vector Quantization (RVQ)

Figure 2:
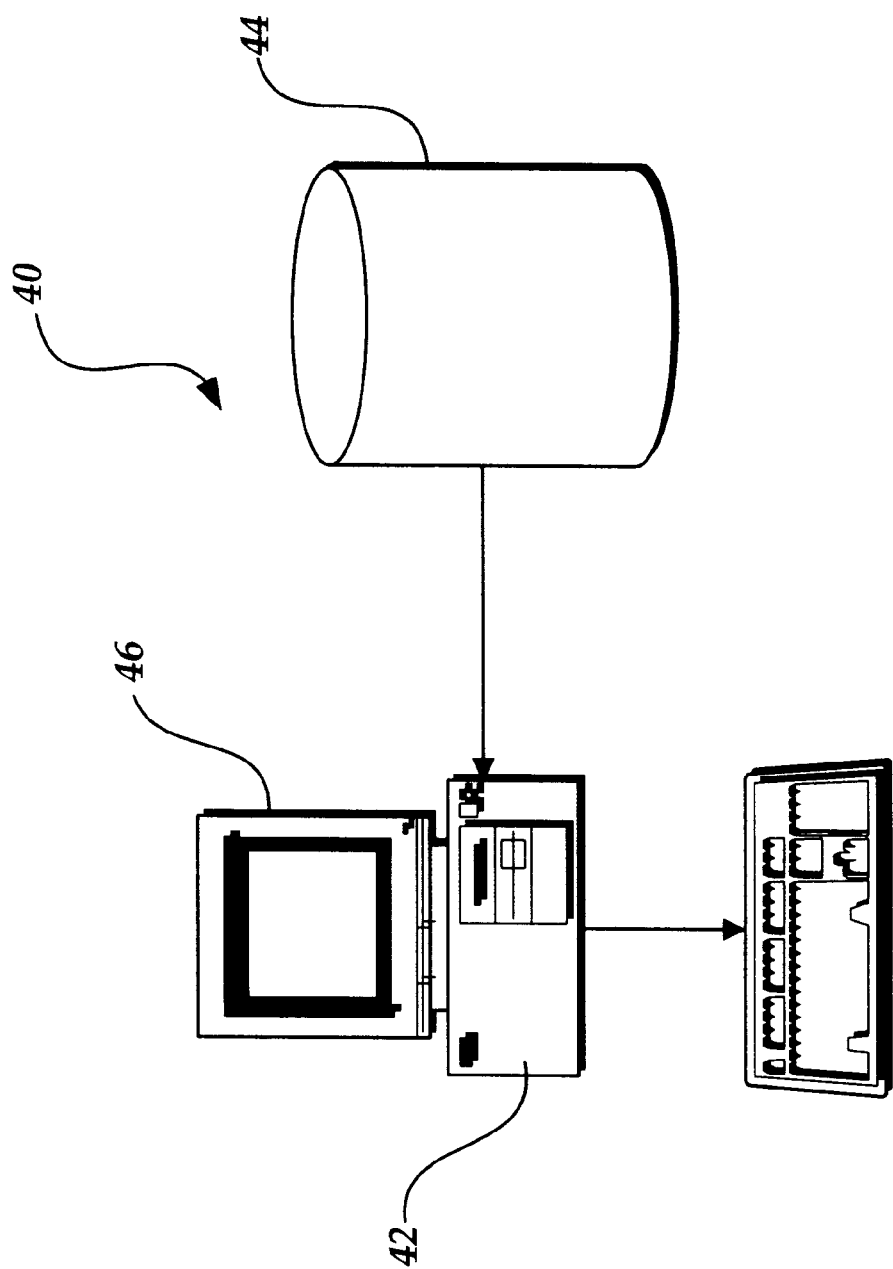
FIG. 2 is a system diagram of a system capable of performing the steps of the present invention.

The present invention is based on residual vector quantization (RVQ) rather than VQ for texture pattern compression and decompression. By way of example, as shown in FIG. 2, the RVQ texture pattern compression and decompression scheme of the present invention can be implemented in a system 40 that includes: a processor 42 for receiving internally or externally created texture patterns; an internal or external memory 44 for storing compressed texture patterns; and a display device 46 for viewing images with uncompressed mapped texture patterns. The texture patterns may be created in a graphics program, digitally scanned into the system or created by other methods known in texture pattern generation. The RVQ codebooks may be implemented in hardware, such as cache memory, on a typical desktop computer when so implemented RVQ codebooks have very little impact on rendering performance.

Figure 3:
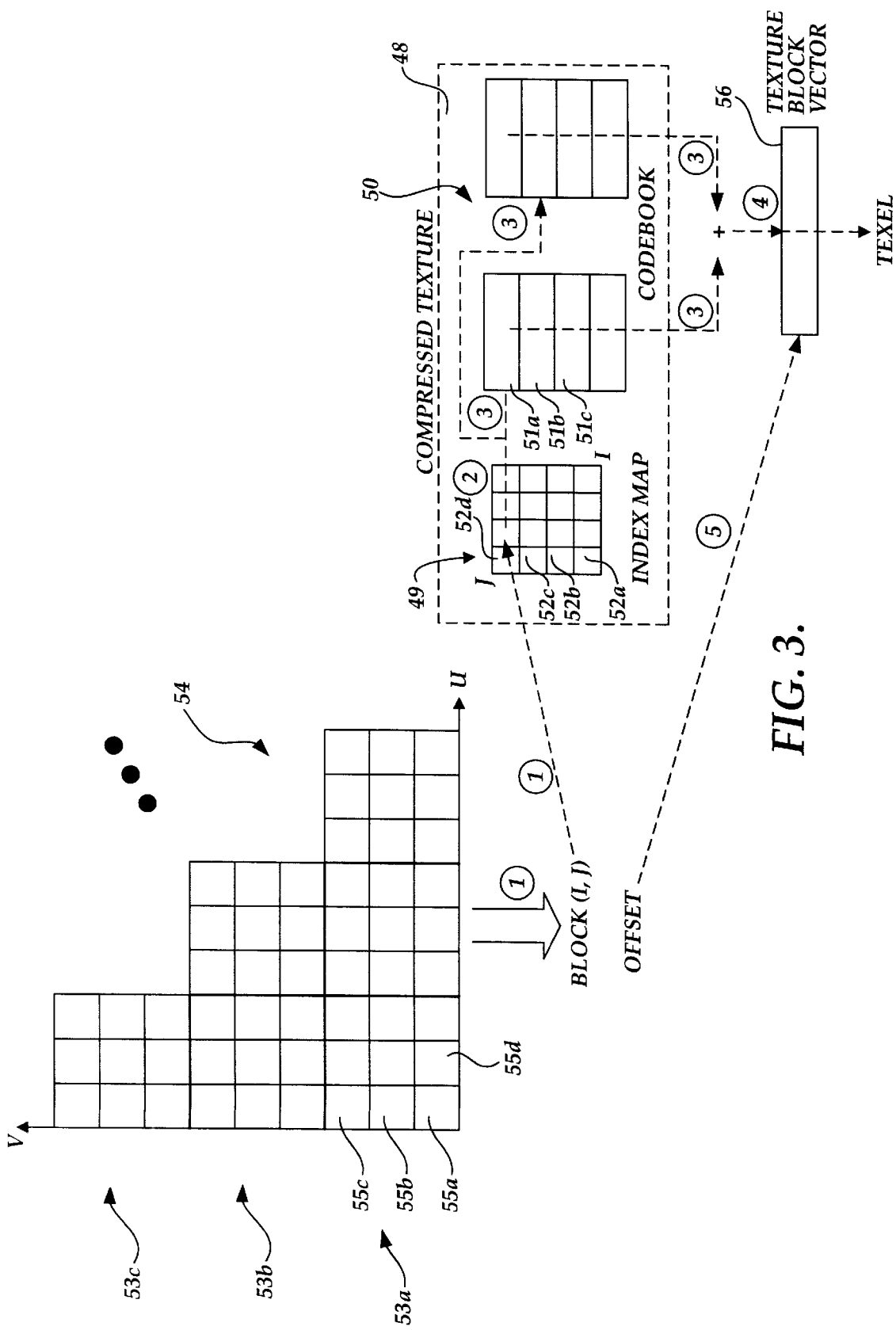
FIG. 3 is a functional illustration of the rendering process performed by the present invention.

As shown in FIG. 3, in accordance with the invention, a compressed texture pattern 48 is represented by an index map 49 and a multi-stage codebook 50. Each stage in the codebook 50 includes codebook blocks 51a, 51b, 51c . . . . The index map 49 includes i×j index blocks 52a, 52b, 52c . . . that correspond to the texture blocks 53a, 53b, 53c . . . of an uncompressed texture pattern 54 in texture space (u, v). Each texture block 53a, 53b, 53c includes an array of texels 55a, 55b, 55c . . . . Each index block 52a, 52b, 52c . . . includes codebook block indices for identifying a codebook block 51a, 51b, 51c . . . within each stage of the codebook 50. Each codebook block 51a, 51b, 51c . . . includes a vector component. Each vector component is a portion of a reduced set of texture block vectors 56. The indices within each index block of the index map identify the vector components within the multi-stage codebook 50 that create the most closely matching texture block vector 56. The texture block vector 56 identifies the texels 55a, 55b, 55c . . . of the texture blocks 53a, 53b, 53c . . . . A texel offset identifies each texel's location within a texture block 53a, 53b, 53c . . . and is used to extract the texel information from the texture block vector 56. Thus, many index blocks 52a, 52b, 52c . . . may reference the same texture block vector 56 created from a very small set of vector components, thereby providing an improved compressed texture pattern.

The steps below describe the RVQ rendering process.

1. Determine the texture block corresponding to a texel requested for display and the texel's offset within the determined texture block and determine the index block (i, j) corresponding to the determined texture block;
2. Lookup the codebook block indices associated with the determined index block;
3. Retrieve the vector components in each stage of the multi-stage codebook that correspond to the codebook block indices;
4. Add the retrieved vector components to identify a texture block; and
5. Lookup the texel within the identified texture block according to the determined texel's offset.

The five step process is shown by the circled numbers in FIG. 3.

The RVQ compression process is described in more detail below with respect to FIGS. 4–7. The RVQ decompression or rendering process is described in more detail below with respect to FIG. 8.

While, like VQ, RVQ includes fixed codebook block index (codeword) length and simple decompression properties, RVQ generally yields better image quality at the same compression ratio. Because an RVQ codebook has multiple stages, an RVQ codebook is smaller in size and, thus, requires less memory than a VQ codebook containing the same texture pattern data. Therefore, an RVQ codebook stores a greater number of representative texture blocks than does a VQ codebook of equal size. As a result, RVQ provides more accurate texture block matches resulting in improved image quality for the same amount of memory storage.

FIG. 4 illustrates the process of texture pattern compression and decompression performed by an embodiment of the present invention. First, a texture pattern 60 is compressed using an RVQ compression scheme 62, thereby producing a compressed texture pattern 64, i.e., the index map 49 and the multi-stage codebook 50. When a request to display part or all of the compressed texture pattern onto an object occurs, the requested compressed texture pattern is decompressed by an RVQ decompression scheme 68, thereby producing a decompressed texture pattern 70 suitable for mapping onto the object. The RVQ texture pattern compression and decompression schemes are described in more detail below with respect to FIGS. 5–7, and 8 and 9, respectively.

RVQ Encoding and Compression

FIG. 5 illustrates the initial determinations performed by the RVQ texture pattern compression scheme. First, if no multi-stage codebook exists, as noted by decision block 80, a multi-stage codebook is created using a representative texture pattern. See block 82. Then, at block 84, a texture pattern is compressed based on the multi-stage codebook. The multi-stage codebook creating step is illustrated in FIG. 6 and described in more detail below.

As can be readily appreciated to those of ordinary skill in the art of image quantization, various iterative clustering algorithms may be used for creating an RVQ multi-stage codebook. Barnes et al., *Vector Quantizers with Direct Sum Codebooks*, IEEE Transactions of Information Theory, Vol. 39, no. 2, March 1993, pp. 565–580 provides an algorithm for yielding a locally optimal multi-stage codebook. At present, the Barnes et al. algorithm is the preferred iterative clustering algorithm to be used in actual embodiments of the present invention. Alternatively, other iterative clustering algorithms such as the Generalized Lloyd Algorithm, Tree Structured Quantization as well as others known by those of ordinary skill in the art of iterative clustering algorithms may also be used for multi-stage codebook creation in the actual embodiment of the present invention.

Figure 7:
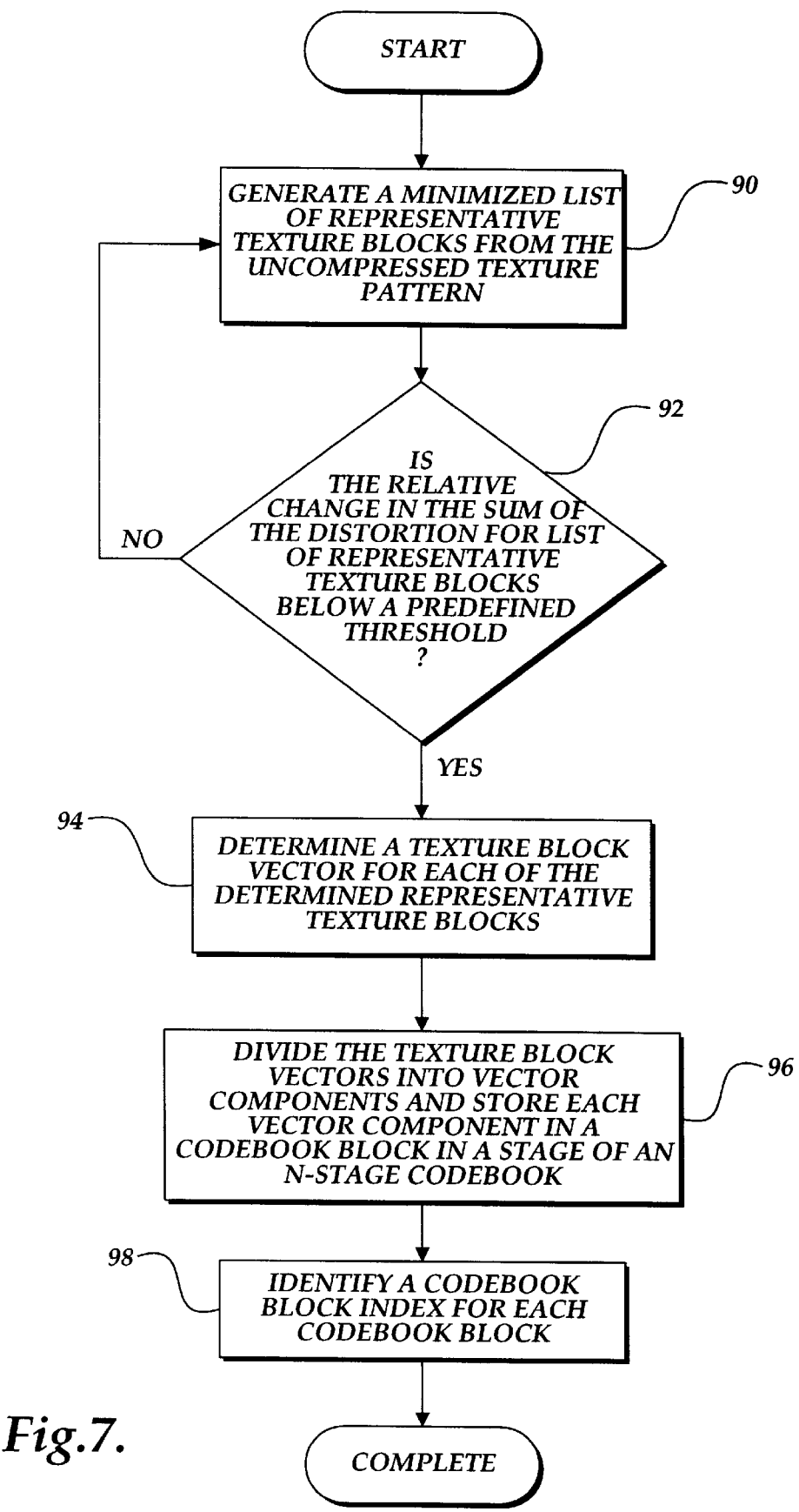

FIGS. 6 and 7 described below illustrate the presently preferred method of creating a multi-stage codebook for use in compressing and decompressing texture patterns. An RVQ codebook includes a series of n stages, wherein each stage is a table of codebook blocks. With n equal to 1, the codebook is a VQ codebook. Each separate entry in a codebook block is a vector component representing part of a texture block vector that identifies a texture block. The texture block includes texels. Mathematically, codebook stage=l is indexed by a k bit integer $p_l$.

As shown in FIG. 6, the multi-stage codebook creating step begins by first transforming a representative texture pattern into texture blocks. See block 86. Each texture block includes an array of texels. At block 88, an optimum multi-stage codebook is generated from the texture blocks. Optimum codebook stage generation is described below in more detail with respect to FIG. 7. The representative texture pattern used for codebook creation is preferably a texture pattern with image quality, resolution and color content similar to texture patterns being compressed.

As shown in FIG. 7, a minimized list of texture blocks that best represent the representative texture pattern is generated from the uncompressed texture pattern. See block 90. This step is performed by an RVQ encoding algorithm such as the Barnes et al. algorithm. If the relative change in the sums of distortion, $D_{rel}$, for each texture block in the minimized list as compared to all the texture blocks falls above a predefined threshold, the step in block 90 is repeated, otherwise the process terminates. See decision block 92.

$$D_{rel} = \frac{(D_l - D_{l-1})}{D_l} \quad (1)$$

$D_l$=sum of distortions for each texture block provided by the $\lambda^{th}$ execution of the RVQ encoding algorithm $D_{l-1}$=sum of distortions for each texture block provided by the $\lambda^{th-1}$ execution of the RVQ encoding algorithm l=execution number of the RVQ encoding algorithm Next, each of the texture blocks in the minimized list is represented as a texture block vector. See block 94. Then, the texture block vectors are subdivided into fixed length vector components and each vector component is stored in a codebook block within the $n^{th}$ stage of the codebook. See block 96. Finally, each codebook block is identified by a codebook block index. See block 98. A vector component is only stored in a single codebook block of a codebook stage, thereby reducing any redundancy within a stage. Barnes et al. also describes the optimum distribution of vector components throughout an multi-stage codebook.

Each execution of the step of block 90 provides a list of texture blocks that better represent the texture blocks in the texture pattern. A common distortion measure for each texture block (block distortion) D is determined in accordance with the following equation:

$$D = (Q(r,n)-b)^T (Q(r,n)-b) \quad (2)$$

b=vector for a texture block r=vector of a texture block generated in block 90 n=number of stages in codebook

Q(r,n)=RVQ decoding function

T=transpose

Other distortion measures also may be used.

Once the codebook has been created texture pattern compression begins. First, a texture pattern to be compressed is transformed into texture blocks. Then, Equations (2) and (3) are repeated in order to find the best match between texture blocks in an uncompressed texture pattern and the minimized list of texture blocks that is stored in the codebook. The codebook block indices of the vector components of the best matching texture blocks are then determined. Then, the codebook block indices are stored in index blocks in an index map, wherein each index block corresponds to each texture block in the uncompressed texture pattern.

RVQ Rendering

Figure 8:
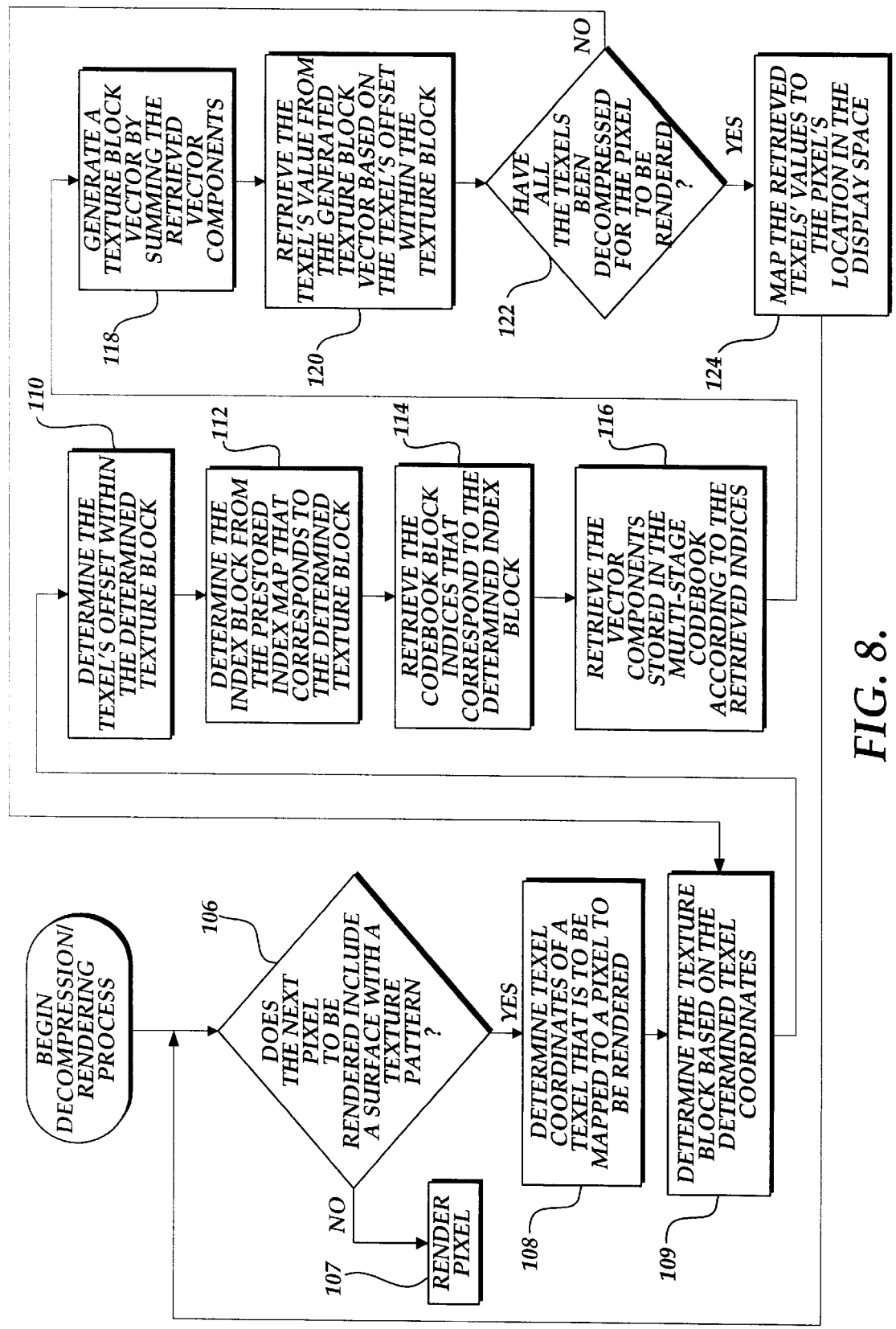
FIG. 8 is a flow diagram of RVQ texture pattern decompression.

FIG. 8 illustrates texture pattern decompression process in more detail. The decompressing of a compressed texture pattern is initiated when a pixel to be rendered includes a mapped compressed texture pattern. See decision block 106. If no compressed texture exists, at block 107, the pixel is rendered based on prestored pixel information. If a compressed texture exists, the coordinates of a texel that is to be mapped to a pixel requested for rendering are determined. See block 108. Next, at blocks 109 and 110, a texture block and the texel's offset within this texture block are determined based on the determined texel coordinates. Then, the index block of the prestored index map that corresponds to the determined texture block is determined. See block 112. Thereafter, at block 114, the codebook block indices for each stage of the multi-stage codebook are retrieved from the determined index block. Next, the vector components are retrieved from the codebook blocks identified by the retrieved codebook block indices. See block 1 16. At block 118, the retrieved vectors are summed, thereby generating a texture block vector. Then, the texel's value is retrieved from the generated texture block vector based on the texel's offset within the texture block. See block 120. At decision block 122, a test is made to determine if all texels have been decompressed for the pixel to be rendered. If not, the sequence cycles to block 109 and the foregoing steps are repeated. If all of the texels associated with the pixel have been decompressed, at block 124, the retrieved texels' values are mapped to the pixel's location in display space.

Thereafter, the decompression process is repeated for other pixels that include a compressed texture pattern.

The decoding function that generates the texture block vector by summing the vector components stored in codebook blocks in the n-stages of the codebook can be mathematically described by the following equation:

$$Q(r, n) = \sum_{l=0}^{n-1} q(p_l) \quad (3)$$

The following example is provided for illustrative purposes only. The example is based on a two-stage codebook, i.e., n=2, mathematically defined by the following equation:

$$\begin{bmatrix} [3\ 8] \\ [6\ 7] \end{bmatrix} \begin{bmatrix} [1\ 11] \\ [7\ 9] \end{bmatrix} \quad (4)$$

As shown in Equation (5), each stage of the codebook has two entries and each entry is a two element vector component, i=1 and j=2 per stage. Each index is a one bit integer, so the codebook block indices r into the codebook is two bits long. The following equations illustrate two possible summed texture block vectors possible by the example codebook above.

$$Q(00,2)=[4\ 19]Q(01,2)=[10\ 17] \quad (5)$$

$$Q(10,2)=[7\ 18]Q(11,2)[13\ 16] \quad (6)$$

The following is an example of the pseudo-code of an RVQ texture pattern encoding algorithm formed in accordance with this invention. In this example, i=codebook stage.

```
CreateCodebook(image input)
{vector centroid;
    int count;
    D1=LARGE_NUMBER
repeat
    for stage=0 to n-1{
    centroid.zero_out( )
    count.zero_out( )
    for all input vectors b(
        r=bestFit(b)
        centroid[p_f(r, stage)]+=b-
        Q(r, stage)
        count[p_f(r,stage)]+=1
    }
    for i=0 to 2^k-1
        codebook[i]=centroid[i]/count[i]
    }
    D2=D1
    D1=0
    for all input vectors b
    D1+=(b-bestFit(b))^T(b-bestFit (b))
until abs((D1-D2)/D1)<epsilon
}
vector Q(int codeword, int stage)
{vector result;
    result.set_to_zero( );
    for i=0 to stage-1
        result+=codebook[i] [p_f(codeword, i)]
}
return result
vector bestFit(vector b)
//Returns codeword which minimizes distortion
//with respect to b
int p_f(int codeword, int stage)
//Returns index p_I for i_{th} stage
```

As will be readily appreciated by those skilled in the texture pattern rendering art and others from the foregoing description, because RVQ texture pattern rendering provides fixed index block (codeword) lengths, which are especially important for hardware implementations, it significantly reduces the complexity of decompression hardware Embodiments of the present invention include simple decompression properties that produce better image quality at the same or better compression ratios than that of previous texture pattern compression techniques, such as VQ.

While the presently preferred embodiment of the invention has been illustrated and described, it is to be understood that various changes can be made therein without departing from the spirit and scope of the invention as defined by the appended claims.

The embodiments of the invention in which an exclusive property or privilege is claimed are defined as follows:

1. A method for compressing an uncompressed texture pattern using a predefined two or more stage codebook with stored texture block vectors, said method comprising the steps of:
   a) selecting a texture block in the uncompressed texture pattern;
   b) obtaining a first component of a texture block vector from a first stage of the two or more stage codebook;
   c) obtaining a second component of a texture block vector from a second stage of the two or more stage codebook;
   d) generating a texture block vector by adding the first and second texture block components;
   e) determining a distortion value of the selected texture block as compared to the texture block vector stored in the two or more stage codebook;
   f) repeating steps b–e for a different texture block vector stored in the two or more stage codebook, if the determined distortion value is above a predetermined threshold:
   g) retrieving the indices of the stored texture block sector in the two or more stage codebook that has a determined distortion value that is below the predetermined threshold, and
   h) storing, the retrieved indices.

2. The method of claim 1, wherein the step of storing further comprises storing the retrieved indices in an index block within an index map, wherein the index blocks correspond to texture blocks in the uncompressed texture pattern.

3. The method of claim 2, wherein the predefined two or more stage codebook was generated based on a representative texture pattern.

4. An apparatus for compressing an uncompressed texture pattern using a predefined two or more stage codebook with stored texture block vectors, said apparatus comprising:
   a means for selecting a texture block in the uncompressed texture pattern;
   a means for generating a texture block vector from a first component of the texture block vector corresponding to a first stage of the two or more stage codebook and a second component of the texture block vector corresponding to a second stage of the two or more stage codebook;

a means for determining a distortion value of the selected texture block as compared to the texture block vector stored in the two or more stage codebook; wherein the determination is repeated for a different texture block vector stored in the two or more stage codebook, until the determined distortion value is below a predetermined threshold;

a means for retrieving the indices of the stored block vector in the two or more stage codebook that has a determined distortion value that is below the predetermined threshold, and a means for storing the retrieved indices.

5. The apparatus of claim 4, wherein the means for storing further comprises a means for storing the retrieved indices in an index block within an index map, wherein the index blocks correspond to texture blocks in the uncompressed texture pattern.

6. The apparatus of claim 5, wherein the predefined two or more stage codebook was generated based on a representative texture pattern.

7. A method for rendering an image with a compressed texture pattern, said compressed texture pattern includes a stored index map that includes index blocks, wherein each index block includes codebook block indices to codebook blocks in a predefined two or more stage codebook and wherein a vector component is prestored in each codebook block, said rendering method comprising the steps of:

a) determining the coordinates of a texel that is to be mapped to a pixel requested for rendering;

b) determining the texture block associated with the determined texel coordinates;

c) determining the texel's offset within the determined texture block based on the determined texel coordinates;

d) determining the index block associated with the determined texture block;

e) retrieving the codebook block indices from the determined index block;

f) retrieving vector components from the two or more stage codebook based on the retrieved codebook block indices;

g) generating a texture block vector by adding the retrieved vector components;

h) retrieving the texel's value from the generated texture block vector based on the determined texel's offset with the texture block;

i) repeating steps a through f for all the texels located within the pixel to be rendered; and j) rendering the pixel based on the retrieved texel values of the texels located within the pixel.

8. An apparatus for rendering an image with a compressed texture pattern, said compressed texture pattern includes a stored index map that includes index blocks, wherein each index block includes codebook block indices to codebook blocks in a predefined two or more stage codebook and wherein a vector component is prestored in each codebook block, said apparatus comprising:

a means for determining the coordinates of a texel that is to be mapped to a pixel requested for rendering;

a means for determining the texture block associated with the determined texel coordinates;

a means for determining the texel's offset within the determined texture block based on the determined texel coordinates;

a means for determining the index block associated with the determined texture block;

a means for retrieving the codebook block indices from the determined index block;

a means for retrieving vector components from the two or more stage codebook based on the retrieved codebook block indices;

a means for generating a texture block vector by adding the retrieved vector components;

a means for retrieving the texel's value from the generated texture block vector based on the determined texel's offset with the texture block; and a means for rendering the pixel based on the retrieved texel values of all the texels located within the pixel.

9. A computer-readable medium having computer-executable instructions for performing the method recited in any one of claims 1–3.

10. A computer system having a processor, a memory, and an operating environment, the computer system operable for performing the method recited in any one of claims 1–3.

11. A computer-readable medium having computer-executable instructions for performing the method recited in claim 7.

12. A computer system having a processor, a memory, and an operating environment, the computer system operable for performing the method recited in claim 7.

13. A computer-readable medium having computer-executable instructions for performing the method recited in claim 8.

14. A computer system having a processor, a memory, and an operating environment, the computer system for performing the method recited in claim 8.

* * * * *

UNITED STATES PATENT AND TRADEMARK OFFICE
CERTIFICATE OF CORRECTION

PATENT NO. : 6,298,169 B1
DATED : October 2, 2001
INVENTOR(S) : B.K. Guenter

It is certified that error appears in the above-identified patent and that said Letters Patent is hereby corrected as shown below:

<u>Title page,</u>
Item [74], *Attorney, Agent or Firm*, "Kindness, PLLC" should read -- Kindness PLLC --

<u>Column 2,</u>
Line 24, "invention a" should read -- invention, a --

<u>Column 3,</u>
Lines 39 and 45, "Lookup" should read -- Look up --

<u>Column 4,</u>
Line 1, "computer when" should read -- computer, when --
Lines 33 and 42, "Lookup" should read -- Look up --

<u>Column 5,</u>
Line 21, "565-580" should read -- 565-580, --
Line 56, "repeated, otherwise" should read -- repeated; otherwise --

<u>Column 6,</u>
Line 11, "an multi-stage" should read -- a multi-stage --
Line 27, "created texture" should read -- created, texture --
Line 40, "illustrates texture pattern" should read -- illustrates the texture pattern --

<u>Column 7,</u>
Line 24, "is two bits" should read -- as two bits --

<u>Column 8,</u>
Line 47, "threshold, and" should read -- threshold; and --

UNITED STATES PATENT AND TRADEMARK OFFICE
CERTIFICATE OF CORRECTION

PATENT NO.    : 6,298,169 B1
DATED         : October 2, 2001
INVENTOR(S)   : B.K. Guenter It is certified that error appears in the above-identified patent and that said Letters Patent is hereby corrected as shown below:

<u>Column 9,</u>
Line 11, "threshold, and" should read -- threshold; and --

Signed and Sealed this

Twenty-sixth Day of August, 2003

JAMES E. ROGAN
*Director of the United States Patent and Trademark Office*